United States Patent [19]

Van Paesschen et al.

[11] 3,840,374

[45] Oct. 8, 1974

[54] MOTION PICTURE FILM HAVING A MAGNETIC STRIPE

[75] Inventors: August Jean Van Paesschen, Antwerpen; Joseph Antoine Herbots, Edegem,, Belgium

[73] Assignee: Agfa-Gevaert N.V., Mortsel, Belgium

[22] Filed: Jan. 24, 1972

[21] Appl. No.: 220,487

[30] Foreign Application Priority Data

Jan. 25, 1971 Great Britain ..................... 3101/71

[52] U.S. Cl. ............................... 96/84, 96/4, 96/79, 117/239

[51] Int. Cl. ............................................. G03c 1/84

[58] Field of Search ........................... 117/235–240, 117/161 C; 260/13 R, 230; 96/84, 79, 4

[56] References Cited

UNITED STATES PATENTS

| | | | |
|---|---|---|---|
| 3,405,104 | 10/1968 | Wakeman et al. | 260/230 X |
| 3,547,690 | 12/1970 | Nickerson et al. | 117/161 |
| 3,647,541 | 3/1972 | Prevot | 117/239 |
| 3,704,167 | 11/1972 | Yamamoto et al. | 117/239 |

*Primary Examiner*—William D. Martin
*Assistant Examiner*—Bernard D. Pianalto
*Attorney, Agent, or Firm*—William J. Daniel

[57] ABSTRACT

The adherence of a magnetic sound stripe to the surface of an anti-halation layer of a multi-layer motion picture film including at least one light-sensitive emulsion layer is enhanced by using as the alkali-soluble binder of the anti-halation layer a polymer containing free carboxyl groups and including in the coating composition of the magnetic stripe a metal complex which is soluble in such coating composition and complexes with the carboxyl groups of the polymeric binder or an organic compound which contains at least two reactive halogen atoms or aldehyde groups reactive with the polymer carboxyl groups.

4 Claims, No Drawings

MOTION PICTURE FILM HAVING A MAGNETIC STRIPE

The invention relates to motion picture film materials containing magnetic recording stripes and more particularly to a process for the application of a magnetic sound stripe to a motion picture film material.

Magnetic recording stripes are applied preferably to the rear-side of the motion picture film support, the front side of the support being provided with a light-sensitive emulsion layer or layers. In general the rear-side is provided with a backing layer that is removable and contains an alkali-soluble resin and a dye or pigment, which is most commonly carbon black, intended to provide antihalation protection and to shield the film from light when placing it in the camera or removing it in daylight. The backing layer is designed in such a way that it is removed in alkaline solutions or in an alkaline solution followed by a water rinse.

In such a film it is obviously impractical to merely apply the magnetic recording stripe to the removable backing layer, since such layer will loosen partially or wholly from the support in the presence of an alkaline solution such as a developer, so that the magnetic recording stripe will be destroyed or damaged.

It has been proposed to apply a stripe of solvent for the antihalation backing layer to those areas of this layer, to which the magnetic recording stripe will be applied, in order to dissolve away the backing layer at these areas. It has been proposed also to remove a strip of the backing layer very accurately by means of sharp knives at the edge of the motion picture film and subsequently to coat the film there with a stripe of magnetisable material, or to cut a groove into the backing layer and to deposit the magnetic sound track therein.

A process has been found now for the application of magnetic sound stripes to the alkali-soluble antihalation layer of a motion picture film so that they form a composite material therewith and firmly adhere to the film support, and are not damaged when the antihalation layer is dissolved away during processing of the motion picture film in alkaline baths.

According to the invention a process is provided for the application of magnetic recording stripes to a multilayer motion picture film material composed of a support, at least one light-sensitive emulsion layer, and at the opposite side of said support an antihalation layer capable of being detached from said support in the presence of an alkaline solution, which process comprises the application to the antihalation layer of stripes from a coating composition containing magnetisable material dispersed in an alkali-insoluble binder and in admixture therewith a cross-linking agent for the alkali-soluble binder of said antihalation layer.

The antihalation layer applied to the rear-side of the motion picture film material comprises a dye or pigment, usually carbon black. The binder may be a cellulose derivative comprising free carboxyl groups, e.g. cellulose acetate phthalate, a polymeric material comprising a sufficient amount of units carrying free acidic groups, e.g. a copolymer of styrene and maleic or (meth)acrylic acid, a copolymer of vinyl acetate and crotonic acid or (meth)acrylic acid, copolymers of alkyl (meth)acrylate and (meth)acrylic acid, or other polymeric material that is soluble or at least removable in an aqueous alkaline solution.

It is obvious that the cross-linking agent present in the sound stripe is to be adapted each time to the binder of the antihalation layer.

Normally not only a sound stripe is applied to the antihalation layer but also a narrow balance stripe to the edge of the film opposite to that of the sound stripe, the balance stripe having the same composition, in order to facilitate rolling up of the motion picture film. Of course, the data given about the composition of the sound stripe also apply to the composition of the balance stripe.

All bis- or polyfunctional compounds that can enter into reaction with the free acid groups of the binder for the antihalation layer and thus accomplish cross-linking of the antihalation layer, can be added as cross-linking agents to the composition of the sound stripe. Such bis- or polyfunctional compounds comprise at least two reactive groups such as:

epoxide groups
aldehyde groups
acryloyl or methacryloyl groups
groups contaning reactive halogen atoms, e.g., sulphofluoride and $-CH_2Cl$ groups, and
soluble metal complexes.

Film-forming polymeric compounds that are insoluble in alkaline solutions can be used as binders for magnetisable material. Appropriate compounds of this type are cellulose esters and ethers, polymerisation products such as polyvinyl chloride and polyvinyl esters, polyacryl compounds that are insoluble in alkali, polycondensation products such as alkyd resins, polyamides, polyesters, polyurethanes, etc. Mixtures of such binders can be used too, of course. Plasticizers for the binder, lubricating agents and wetting agents can be added also to the coating solution of the magnetic recording stripe.

Very interesting coating compositions forming magnetic recording stripes are described in the United Kingdom Patent Specifications Nos. 986,473—991,675—1,058,425—1,080,614—1,152,651 and 1,153,316.

Suitable supports for motion picture film are films made of film-forming polymers such as cellulose esters, e.g. cellulose triacetate, polycarbonates based on bis-hydroxyphenyl-alkanes or polyesters preferably polyethylene terephthalate.

Since as a binder for the antihalation layer the cellulose acetate phthalate used in some of the Examples should be soluble in alkaline medium, a cellulose acetate phthalate having a degree of acetyl substitution (D.S. acetyl) varying between 1.0 and 1.7 and a degree of phthalyl substitution (D.S. phthalyl) varying between 0.6 and 1.2 is used.

The process of the invention could be modified also in that a thin intermediate layer is applied to the very places whereon the sound stripe and the balance stripe are to be coated, the intermediate layer then comprising a compound, which by reaction with the acid groups of the alkali-soluble binder for the antihalation layer would make the carbon black antihalation layer insoluble in the alkaline processing baths. However, this is not easy at all and moreover, it would require an additional step in the manufacture of the motion picture film material. So, preference is given to the incorporation of the cross-linking agent for the alkali-soluble binder for the antihalation layer into the sound stripe itself, so that right under the sound stripe the antihalation layer becomes insoluble in alkaline baths.

In the following examples the first is given merely for comparison. It describes the manufacture of a representative motion micture film, the antihalation layer of which has been provided with a magnetic recording stripe and a balance stripe that do not contain a cross-linking agent.

EXAMPLE 1

A cellulose triacetate support, the front side of which had been provided with a known subbing layer and one or more light-sensitive emulsion layers for colour photography, was coated on its rear-side successively with the following layers:

a. an anticurling layer of cellulose diacetate having the following composition:

| | |
|---|---|
| cellulose acetate (D.S. acetyl 2.5) in the form of a 5% solution in acetone | 100 ml |
| acetone | 750 ml |
| methanol | 75 ml |
| n-butanol | 75 ml |

The layer was coated at a ratio of 38 sq.m/litre.

b. an antihalation layer having the following composition:

| | |
|---|---|
| cellulose acetate phthalate (D.S. acetyl 1.30 - D.S. phthalyl 0.82) | 30 g |
| colloidal carbon having a particle size of 500 A | 8 g |
| ethylene glycol monomethyl ether | 250 ml |
| acetone | 150 ml |
| ethanol | 600 ml |

The layer was coated at a ratio of 30 sq.m/litre.

Narrow stripes of the following composition were then applied as sound stripe and balance stripe to the antihalation layer:

| | |
|---|---|
| magnetic iron oxide | 210 g |
| cellulose nitrate | 60 g |
| dioctyl phthalate | 30 ml |
| acetone | 100 ml |
| methyl ethyl ketone | 750 ml |
| isopropanol | 100 ml |
| dimethylformamide | 50 ml. |

Both stripes were coated in such a way that upon drying a thickness of 13 micron was obtained. The adhesion of the sound stripe as well as of the balance stripe to the carbon black layer was excellent. When an adhesive tape was applied to the stripes and then torn off at an acute angle, the sound stripe was left undamaged, even after the material had been scratched several times to facilitate the tearing off.

After the classical processing of the photographic colour material the black carbon layer had disappeared also under the edges of the sound stripe. This deficiency leads to the scaling of the sound stripe when in contact with the recording heads, the latter being soiled thereby. This phenomenon is confirmed also when an adhesive tape applied and pressed to the sound stripe is torn off. Both edges of the sound stripe are torn off very easily indeed.

EXAMPLE 2

The process of example 1 was repeated, with the difference, however, that 30 g of a methacrylic acid chromium chloride complex according to the following formula were added to the coating composition of the sound stripe (and of the balance stripe):

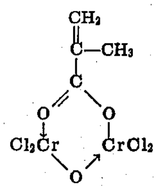

The adhesion of the sound stripe to the antihalation layer before processing was excellent. In contrast with example 1, no material at all of the sound stripe could be torn off by means of an adhesive tape after processing. This was confirmed by a microscopic examination, which proved that the carbon black layer under the sound stripe had not been dissolved and remained completely intact.

EXAMPLES 3 and 4

The process of example 2 was repeated, with the difference, however, that the 30 g of methacrylic acid chromium chloride complex were replaced by:

in example A:

30 g of *m*-benzenedisulphofluoride according to the following formula:

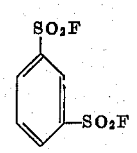

in example B:

30 g of octanedial according to the following formula:

$$OHC\text{-}(CH_2)_6\text{-}CHO$$

In both these cases the adhesion to the black antihalation layer was excellent before processing. After processing in the normal baths for colour material the antihalation layer had disappeared. Under the sound stripe the antihalation layer remained intact, as could be proved by the test with the adhesive tape and by microscopical examination.

We claim:

1. Multilayer motion picture film material comprising a support, at least one light-sensitive emulsion layer and at the opposite side of said support an antihalation layer comprising an alkali-soluble polymeric binder containing free carboxyl groups and capable of being detached from said support in the presence of an alkaline medium, and deposited upon said antihalation layer stripes of a coating composition of magnetizable material dispersed in an alkali-insoluble binder in admixture with an organic compound containing at least two aldehyde groups reactive with the carboxyl groups of said polymeric binder.

2. Multilayer motion picture film material according to claim 1, wherein the alkali-soluble polymeric binder for said antihalation layer is cellulose acetate phthalate having a degree of acetyl substitution between 1.0 and 1.7 and a degree of phthalyl substitution between 0.6 and 1.2.

3. Multilayer motion picture film material comprising a support, at least one light-sensitive emulsion layer and at the opposite side of said support an antihalation layer comprising an alkali-soluble polymeric binder containing free carboxyl groups and capable of being detached from said support in the presence of an alkaline medium, and deposited upon said antihalation layer stripes of a coating composition of magnetizable material dispersed in an alkali-insoluble binder in admixture with a metal complex which is soluble in said coating composition and complexes with the carboxyl groups of said binders.

4. Multilayer motion picture film material according to claim 3, wherein the alkali-soluble polymeric binder for said antihalation layer is cellulose acetate phthalate having a degree of acetyl substitution between 1.0 and 1.7 and a degree of phthalyl substitution between 0.6 and 1.2.

* * * * *